United States Patent Office 2,966,504
Patented Dec. 27, 1960

2,966,504

METHODS OF PRODUCING 16-OXY STEROIDS

David Taub, Metuchen, and Norman L. Wendler, Summit, N.J., assignors to Merck & Co., Inc., Rahway, N.J., a corporation of New Jersey No Drawing. Filed Feb. 5, 1957, Ser. No. 638,238

3 Claims. (Cl. 260—397.45)

This invention relates generally to new steroid esters. More particularly, it is concerned with 21-monoesters of 9α-fluoro-1,4-pregnadiene - 11β,16α,17α,21 - tetrol - 3,20-dione and 9α - fluoro - 4 - pregnene-11β,16α,17α,21-tetrol-3,20-dione, and with methods for making these new steroids.

9α-fluoro-1,4 - pregnadiene - 11β,16α,17α,21 - tetrol - 3, 20-dione, and the 16α,21-diacetate thereof are known compounds reported to possess a high degree of cortisone-like anti-inflammatory activity with little of the undesirable salt-retaining side effects often found in steroids having high anti-inflammatory activity. 9α-fluoro-4-pregnene-11β,16α,17α,21-tetrol-3,20-dione, and the 16α,21-dilower acylates thereof are also reported to possess anti-inflammatory activity. The latter compounds are likewise intermediates in a synthesis of the more active 1,4-dienes. However, the published syntheses of these steroids do not lead to a C–21 monoacylate derivative, and there is no feasible method described in the literature for making the 21-monoesters from either the 16α,21-diacylates or from the free alcohols.

It is an object of our invention to provide the 21-mono lower acylates, and particularly the 21-monoacetates, of 9α-fluoro-1,4-pregnadiene - 11β,16α,17α,21 - tetrol - 3,20-dione and 9α - fluoro - 4 - pregnene-11β,16α,17α,21-tetrol-3,20-dione. Expressed in another way, an object of the invention is to make available a 9α-fluoro-pregnane-11β, 16α,17α,21-tetrol-3,20-dione 21-lower acylate having at least one double bond in conjugation with the keto substituent at the 3-position of the molecule. There may be two double bonds conjugated with the C–3 ketone, i.e. as in the Δ$^{1,4}$-3-ketones, or only one, as in the Δ$^4$-3-ketones. The 21-monoacetate esters are as active physiologically as the free alcohol or the 16α,21-diacetate. The 21-monoesters, however, are more readily purified and characterized than the diesters or the free alcohol, are better for certain applications than the diester or alcohol, and are preferred intermediates when it is desired to effect further chemical transformations involving the 16 and 17-positions of the molecule. Another object of our invention is a method for making a 9α-fluoro-4-pregnene-11β,16α,17α,21-tetrol-3,20-dione 21-lower acylate or a Δ$^1$-derivative thereof from the corresponding 9α-fluoro-4-pregnene-11β,17α,21 - triol - 3,20 - dione 21-lower acylate. Additional objects will be evident from the explanation of our invention hereinbelow.

The process for making these new compounds may be shown by the following flow diagram:

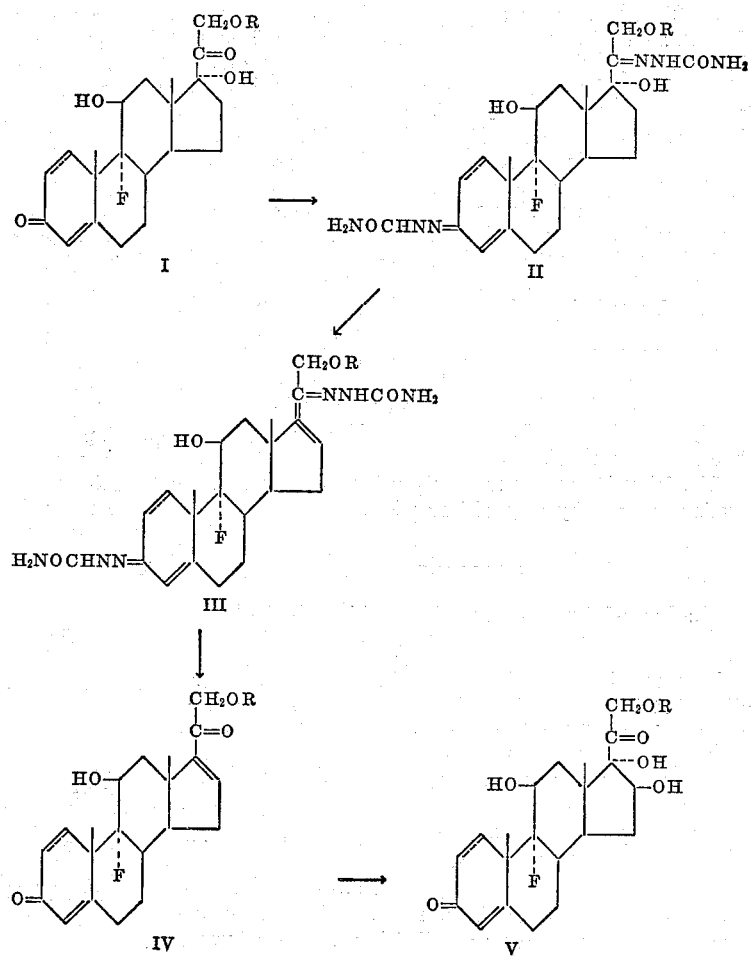

wherein R is a lower acyl radical. The broken line between carbon atoms 1 and 2 indicates that there is a double bond in this position in certain of our compounds. For clarity's sake, we have limited the discussion of our process below to the Δ$^{1,4}$-3-keto series of compounds, but it will be apparent that this explanation is equally applicable to the Δ$^4$-3-ketones as well.

In the first step of our process 9α-fluoro-1,4-pregnadiene-11β,17α,21-triol-3,20-dione (I) is treated with semicarbazide at an elevated temperature in order to form the 3,20-bis-semicarbazone (II). We prefer in this and in the subsequent steps of our process to use the 21-acetate, although esters of the steroid 21-alcohol with other lower aliphatic carboxylic acids may be employed. Examples of suitable acids, besides acetic acid, are propionic acid, butyric acid, valeric acid and tertiary-butyl-acetic acid.

The steroid 3,20-bis-semicarbazone (II) is next converted to 9α-fluoro-1,4,16-pregnatriene-11β,21-diol-3,20-bis-semicarbazone 21-lower acylate (III) by heating in excess acetic acid. This reaction is preferably conducted at the reflux temperature of the acetic acid in an inert atmosphere in order to obtain optimum yields of the triene with minimum side reactions.

In the third step of the synthesis, 9α-fluoro-1,4,16-pregnatriene-11β,21-diol-3,20-dione 21-lower acylate (IV) is obtained by treating the 3,20-bis-semicarbazone (III) with hydrochloric acid. This reversal of the semicarbazone to the parent ketone is conveniently accomplished by refluxing an organic solvent solution of the steroid with dilute aqueous hydrochloric acid. Water-immiscible organic solvents such as ethylene dichloride, methyl ethyl ketone, chloroform, carbon tetrachloride, benzene and ethyl isobutyl ketone are suitable solvents; as the aqueous acid phase in the reaction we prefer to use from about 0.2 N to about 2.5 N aqueous hydrochloric acid.

The final step of the process is carried out by reacting 9α-fluoro-1,4,16-pregnatriene-11β,21-diol-3,20-dione 21-lower acylate with osmium tetroxide. We prefer to effect this hydroxylation at the 16:17 double bond at room temperature in an organic solvent such as dioxane, benzene or a benzene-pyridine mixture. The intermediate osmate ester is decomposed by bubbling hydrogen sulfide gas through the reaction mixture, whereby the osmium precipitates and is readily removed from the mixture by filtration. The desired 9α-fluoro-1,4-pregnadiene-11β,16α,17α,21-tetrol-3,20-dione 21-lower acylate (V) may then be recovered in pure form from the organic solvent by techniques known in the art. Alternatively, this latter step may be carried out by treating the Δ$^{16}$-steroid (IV) with potassium permanganate in aqueous acetone.

If desired, the 21-monoester may be hydrolyzed directly, or after purification, with acid or base to the known free alcohol.

The following examples are given for purposes of illustration and not by way of limitation:

EXAMPLE 1

*9α-fluoro-1,4-pregnadiene-11β,17α,21-triol-3,20-bis-semicarbazone 21-acetate*

To a solution of 1.473 grams of 9α-fluoro-1,4-pregnadiene-11β,17α,21-triol-3,20-dione 21-acetate in 15 ml. of methanol and 7.5 ml. of dimethylformamide is added 1.05 grams semicarbazide base and 0.39 gram of semicarbazide hydrochloride. The mixture is refluxed for three hours under nitrogen and is then cooled to 20° C. Sixty ml. of water is added with stirring and the mixture cooled to 5° C. for one hour. The precipitated 9α-fluoro-1,4-pregnadiene-11β,17α,21-triol-3,20-bis-semicarbazone 21-acetate is collected, washed with aqueous methanol and water, and dried in a current of warm air. 1.68 grams of product is obtained, melting point >300° C., $$\lambda_{Max.}^{MeOH} \ 292 \ m\mu \ E\% \ 460, \ 242 \ m\mu \ E\% \ 400$$

EXAMPLE 2

*9α-fluoro-1,4,16-pregnatriene-11β,21-diol-3,20-bis-semicarbazone 21-acetate*

A solution of 400 mg. of 9α-fluoro-1,4-pregnadiene-11β,17α,21-triol-3,20-bis-semicarbazone 21-acetate in 7 ml. of acetic acid is refluxed under nitrogen for one hour. The solvent is then removed in vacuo to give a residue containing 9α-fluoro-1,4,16-pregnatriene-11β,21-diol-3,20-bis-semicarbazone 21-acetate.

EXAMPLE 3

*9α-fluoro-1,4,16-pregnatriene-11β,21-diol-3,20-dione 21-acetate*

The residue obtained in Example 2 is partitioned between 20 ml. of 0.25 N hydrochloric acid and 15 ml. of a 3:2 mixture of ethylene dichloride-methyl ethyl ketone. The mixture is refluxed for 20 minutes with vigorous stirring, cooled and the organic phase separated. The process is repeated five times with fresh organic phase each time. The combined organic phases are then washed with dilute potassium bicarbonate and water, and dried over magnesium sulfate. The residue obtained on removal of the organic solvent is treated with acetic anhydride and pyridine for 16 hours at 20° C. The reaction mixture is evaporated to dryness in vacuo and the residue chromatographed on neutral alumina. Elution with benzene-chloroform gives 9α-fluoro-1,4,16-pregnatriene-11β,21-diol-3,20-dione 21-acetate, melting point 215–220° C., $$\lambda_{Max.}^{MeOH} \ 238.5 \ m\mu \ E\% \ 624$$

EXAMPLE 4

*9α-fluoro-1,4-pregnadiene-11β,16α,17α,21-tetrol-3,20-dione 21-acetate*

To a stirred solution of 40 mg. of 9α-fluoro-1,4,16-pregnatriene-11β,21-diol-3,20-dione 21-acetate in 2 ml. of dioxane is added 0.25 ml. of a 10% solution of osmium tetroxide in dioxane. The mixture is allowed to stand for 11 hours at 25° C. after which hydrogen sulfide gas is bubbled through the mixture for one hour. The resultant black precipitate is removed by suction filtration and washed with dioxane. The filtrate and washings are taken to dryness in vacuo and the residue partitioned between chloroform and water. The chloroform extract is dried over magnesium sulfate, clarified with activated charcoal and taken to dryness in vacuo. The crystalline residue is crystallized from acetone-ether to give 9α-fluoro-1,4-pregnadiene-11β,16α,17α,21-tetrol-3,20-dione 21-acetate, melting point 212–215° C., $$\lambda_{Max.}^{MeOH} \ 239 \ m\mu \ E\% \ 325$$

EXAMPLE 5

*9α-fluoro-1,4-pregnadiene-11β,16α,17α,21-tetrol-3,20-dione*

To a stirred solution of 100 mg. of 9α-fluoro-1,4-pregnadiene-11β,16α,17α,21-tetrol-3,20-dione 21-acetate in 4 ml. of methanol under nitrogen is added one equivalent of sodium methoxide in 2 ml. of methanol. After eight minutes at 25° C. the mixture is neutralized with 50% aqueous acetic acid and concentrated to dryness in vacuo. Addition of water precipitated the tetrol which is purified by crystallization from acetone-ether, melting point 256–260° C.

$$\lambda_{Max.}^{CH_3OH} \ 238 \ m\mu \ E\% \ 375$$

EXAMPLE 6

*9α-fluoro-4,16-pregnadiene-11β,21-diol-3,20-dione 21-acetate*

Five grams of semicarbazide and three grams of semicarbazide hydrochloride in 10 ml. of water is added to five grams of 9α-fluorohydrocortisone acetate in 200 ml. of methanol. The reaction mixture is refluxed for four hours and then cooled to 5° C. The crystalline 9α-fluorohydrocortisone acetate-3,20-bis-semicarbazone which crystallizes on cooling is isolated by filtration and dried in vacuo, melting point 230–300° C. (slowly darkens).

$$\lambda_{Max.}^{MeOH} \ 267 \ m\mu \ E\% \ 571$$

Five grams of the 3,20-bis-semicarbazone obtained immediately above is refluxed for one hour in 100 ml. of acetic anhydride. The reflux is carried out in a nitrogen atmosphere. The reaction mixture is then concentrated in vacuo to a volume of about 60 ml., treated with 15 ml. of pyruvic acid and 30 ml. of water, allowed to stand at room temperature for 18 hours. At the end of this time 400 ml. of chloroform are added. The chloroform solution is separated and washed successively with water, 5% potassium bicarbonate solution, water, saturated sodium chloride solution and finally dried over magnesium sulfate. The chloroform is removed in vacuo and the crude product thus obtained chromatographed on 100 grams of neutral alumina. The column is eluted with benzene-chloroform mixtures and from the fractions corresponding to 10–50% chloroform-benzene there is obtained 9α-fluoro-4,16-pregnadiene-11β,21-diol-3,20-dione 21-acetate, melting point 184–185.5° C.

$$\lambda_{Max.}^{MeOH} \ 239 \ m\mu \ E\% \ 637$$

EXAMPLE 7

*9α-fluoro-4-pregnene-11β,16α,17α,21-tetrol-3,20-dione 21-acetate*

To a solution of 50 mg. of 9α-fluoro-4,16-pregnadiene-11β,21-diol-3,20-dione 21-acetate in a mixture of 1.5 ml. of benzene and 0.02 ml. of pyridine is added 32 mg. of osmium tetroxide in 0.9 ml. of benzene. The mixture is allowed to stand at 24° C. for 16 hours and then concentrated in vacuo. The residue is dissolved in dioxane and hydrogen sulfide is bubbled through the mixture for one hour. The resultant black precipitate is removed by suction filtration and washed with dioxane. The filtrate and washings are concentrated in vacuo to dryness and the residue partitioned between water and chloroform. The chloroform extract is dried over magnesium sulfate, clarified with activated charcoal and taken to dryness in vacuo. The residue is crystallized from acetone to give 9α-fluoro-4-pregnene-11β,16α,17α,21-tetrol-3,20-dione 21-acetate of melting point 221–224° C.

Any departure from the above description which conforms to the present invention is intended to be included within the scope of the claims.

What is claimed is:

1. The process which comprises treating a 9α-fluoropregnane-11β,17α,21-triol-3,20-dione 21-lower acylate having at least one double bond in conjugation with the keto substituent at C-3 with semicarbazide to form the 3,20-bis-semicarbazone derivative, heating said compound with acetic acid to produce a 9α-fluoro-16-pregnene-11β,21-diol-3,20-bis-semicarbazone 21-lower acylate, treating the latter compound with hydrochloric acid at an elevated temperature to form the corresponding 3,20-diketone, reacting the resulting 3,20-diketone with osmium tetroxide and decomposing the resulting reaction product with hydrogen sulfide to produce a 9α-fluoropregnene-11β,16α,17α,21-tetrol-3,20-dione 21-lower acylate having at least one double bond in conjugation with the keto substituent at C-3.

2. The process which comprises treating 9α-fluoro-1,4-pregnadiene-11β,17α,21-triol-3,20-dione 21-acetate with semicarbazide to form 9α-fluoro-1,4-pregnadiene-11β,17α,21-triol-3,20-bis-semicarbazone 21-acetate, heating said compound with acetic acid to produce 9α-fluoro-1,4,16-pregnatriene-11β,21-diol-3,20-bis-semicarbazone 21-acetate, treating the latter compound with hydrochloric acid at an elevated temperature to form 9α-fluoro-1,4,16-pregnatriene-11β,21-diol-3,20-dione 21-acetate, reacting said triene with osmium tetroxide and decomposing the resulting reaction product with hydrogen sulfide to produce 9α-fluoro-1,4-pregnadiene-11β,16α,17α,21-tetrol-3,20-dione 21-acetate.

3. The process which comprises treating 9α-fluoro-4-pregnene-11β,17α,21-triol-3,20-dione 21-acetate with semicabazide to form 9α-fluoro-4-pregnene-11β,17α,21-triol-3,20-bis-semicarbazone 21-acetate, heating said compound with acetic acid to produce 9α-fluoro-4,16-pregnadiene-11β,21-diol-3,20-bis-semicarbazone 21-acetate, treating the latter compound with hydrochloric acid at an elevated temperature to form 9α-fluoro-4,16-pregnadiene-11β,21-diol-3,20-dione 21-acetate, reacting said triene with osmium tetroxide and decomposing the resulting reaction product with hydrogen sulfide to produce 9α-fluoro-4-pregnene-11β,16α,17α,21-tetrol-3,20-dione 21-acetate.

References Cited in the file of this patent

UNITED STATES PATENTS

| | | |
|---|---|---|
| 2,773,080 | Bernstein et al. | Dec. 4, 1956 |
| 2,789,118 | Bernstein et al. | Apr. 16, 1957 |
| 2,814,631 | Gould | Nov. 26, 1957 |
| 2,822,318 | Kroll et al. | Feb. 4, 1958 |

OTHER REFERENCES

Allen et al.: J. Am. Chem. Soc., vol. 78 (May 5, 1956), pages 1909–1913 (pages 1910 and 1911 necessary).